April 5, 1932.  N. SLOBOTKIN  1,852,270
WINDOW SHADE ADJUSTER
Filed Dec. 6, 1930  2 Sheets-Sheet 1
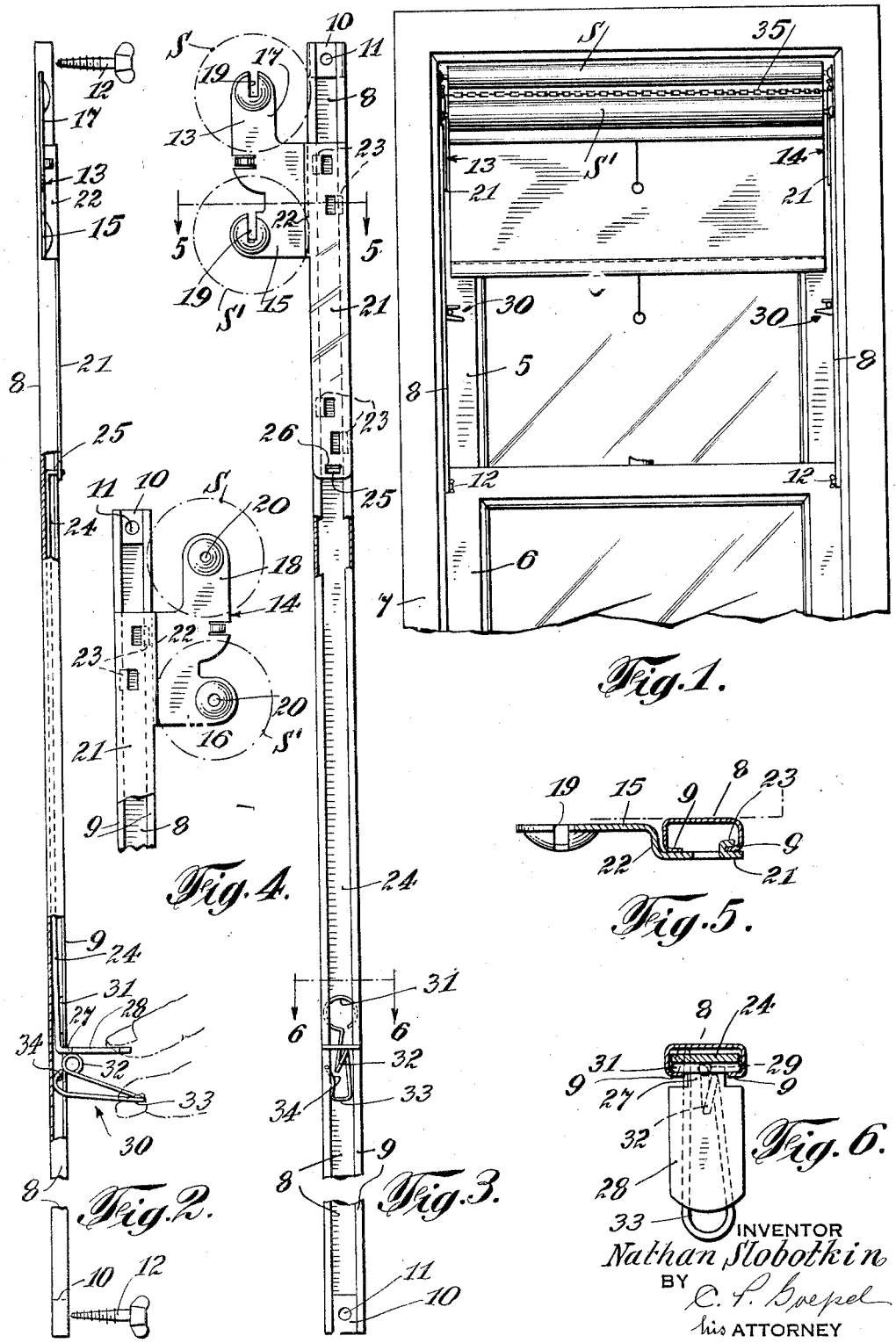

April 5, 1932.  N. SLOBOTKIN  1,852,270
WINDOW SHADE ADJUSTER
Filed Dec. 6, 1930   2 Sheets-Sheet 2
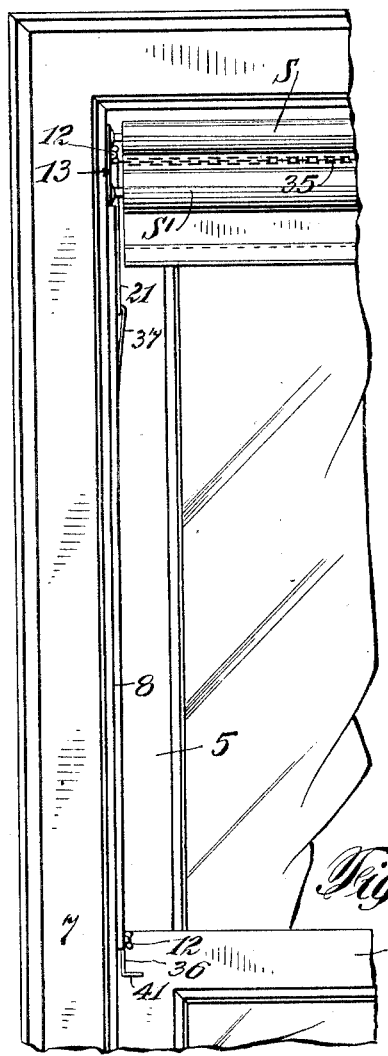
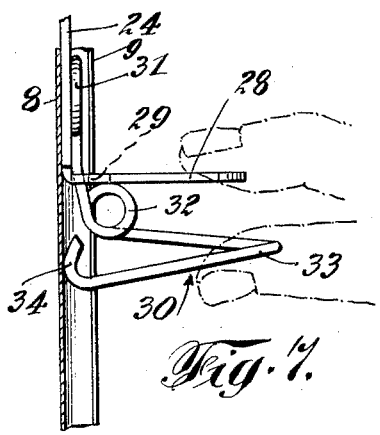
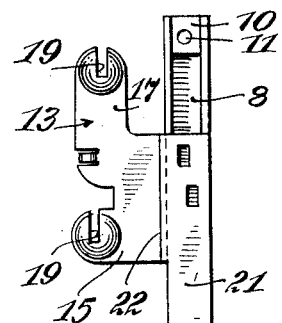
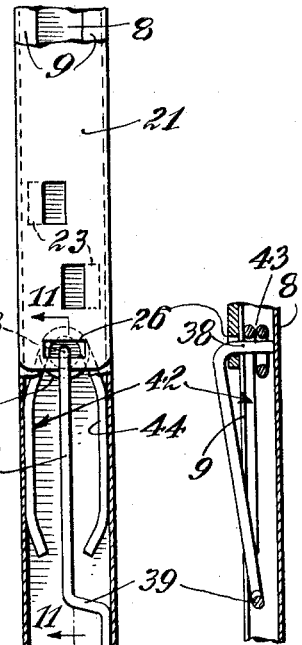
INVENTOR
Nathan Slobotkin
BY C. P. Goepel
his ATTORNEY Patented Apr. 5, 1932

1,852,270

UNITED STATES PATENT OFFICE

NATHAN SLOBOTKIN, OF BROOKLYN, NEW YORK

WINDOW SHADE ADJUSTER

Application filed December 6, 1930. Serial No. 500,476.

This invention relates to an improved window shade adjuster, and has for its general object and purpose to provide a simply constructed, durable and easily applied device of this kind for supporting the window shade for bodily vertical movement relative to the window sash and frame so that the shade may be easily lowered to an adjusted position for the purpose of obtaining ventilation at the top of the window and avoiding flapping of the frame by strong air currents and possible injury thereto.

In one practical embodiment of the invention, I provide vertical guides adapted to be attached to the opposite sides of the window frame and shade supporting brackets slidably mounted upon said guides. It is one of the important objects of the invention to provide novel, simply constructed and very effective means for securely locking or holding the brackets in their adjusted positions upon the respective guides.

The invention has for an additional object to provide a very simple and inexpensive construction of the bracket guides together with novel means for slidably mounting the brackets upon said guides.

Another object of the invention is to provide actuating means for the brackets slidably mounted in the respective guides and co-operating therewith so as to permit of their free relative movement while preventing vibration or chattering metallic contact with the guides.

It is also a further object of the invention to provide improved means for restraining the shade brackets in their vertical adjustment against movement to such positions out of horizontal alignment with each other as would release one end of the shade whereby the same would become detached from the brackets.

With the above and other objects in view, the invention consists in the improved adjusting means for window shades, and in the form, construction and relative arrangement of the several parts thereof as will be hereinafter more fully described, illustrated in the accompanying drawings, and subsequently incorporated in the subjoined claims.

In the drawings, wherein I have disclosed several simple and practical embodiments of the invention, and in which similar reference characters designate corresponding parts throughout the several views,—

Figure 1 is a front elevation showing one form of my present invention as applied in practical use;

Fig. 2 is an edge view of one of the adjusting devices, the guide member being shown partly in section;

Fig. 3 is a side elevation of the adjusting device;

Fig. 4 is a detail fragmentary elevation of the other adjusting device showing the mounting of the said bracket upon the guide member;

Fig. 5 is a horizontal sectional view on an enlarged scale taken on the line 5—5 of Fig. 3;

Fig. 6 is a similar sectional view taken on the line 6—6 of Fig. 3;

Fig. 7 is an enlarged detail view of the latch means for the adjustable bracket and its actuating member, illustrating the manner of releasing the same to effect adjustment of the bracket;

Fig. 8 is an enlarged fragmentary front elevation of a window having a slightly modified form of the device applied thereto;

Fig. 9 is an enlarged side elevation partly broken away in such modified construction;

Fig. 10 is a fragmentary elevation on an enlarged scale partly in section, showing the modified form of latch means and actuating member;

Fig. 11 is a longitudinal sectional view taken on the line 11—11 of Fig. 10, and Fig. 12 is a horizontal sectional view taken on the line 12—12 of Fig. 10.

Referring in detail to the drawings, for purposes of illustration, I have shown the conventional upper and lower window sashes 5 and 6 slidably mounted in the frame 7.

Upon the inner side of the window frame and upon the opposite vertical parts thereof, my improved shade adjusting devices are mounted. As herein shown, each of these devices includes a vertically extending guide 8. This guide is preferably in the form of a channel shaped sheet metal strip, the parallel longitudinal portions of which have their edges inwardly turned or flanged as at 9.

The opposite ends of the channel of this guide strip are closed by the metal blocks or parts 10 which are welded or otherwise securely fixed therein, each of said closure blocks having an opening 11 therethrough coinciding with an opening provided in the base wall of the channel shaped guide to receive an attaching screw indicated at 12. These screws may be either of the conventional type having a kerfed head to receive the bit of a screw-driver or they may be provided with winged heads as illustrated whereby they may be conveniently manipulated by hand without the use of a tool.

Upon each of the guides 8, a shade supporting bracket 13 and 14 respectively, is slidably mounted. While these brackets may be provided with means to support only a single shade, as herein shown, each bracket has a lower part 15, 16 respectively, and an upwardly projecting part 17 and 18 respectively. These upper and lower spaced parts of the bracket 13 are provided with the usual vertically extending slots 19 to receive the rectangular spring winding trunnions at one end of the rollers of the upper and lower shades S and S' respectively. The upper and lower parts of the other bracket 14 are provided with the usual circular openings 20 therein to receive the cylindrical studs projecting from the opposite ends of the respective shade rollers.

Each bracket member is integrally connected with and angularly offset from the plane of an elongated plate 21 which extends over the open side of the channel shaped guide 8 and is supported upon the in-turned flanges 9 thereof. The angular offset 22 which connects the bracket member with one end of the plate 21 closely overlies one of the side walls of the guide 8 and the bracket member is thus positioned closely adjacent to the surface of the window frame and in inwardly projecting relation to the guide 8.

While various means may be used for slidably retaining the plate 8 in connection with the guide, one simple and convenient means for this purpose may comprise the bent lugs or tongues 23 struck inwardly from the plate 21 and extending in opposite directions under the inwardly extending flanges 9 of the guide. Preferably, a pair of such retaining lugs is provided at the opposite ends of the plate 21.

In the embodiment of the invention shown in Figs. 1 to 7 inclusive, an actuating member for the shade supporting bracket in the form of a long substantially rigid metal bar 24 is slidably disposed in the channel of each guide member. This bar may be of slightly less width than the internal width of the guide so that frictional contact between said bar and the side walls of the guide will not resist or retard the free vertical sliding movement of said bar. The bar 24 at its upper end is provided with an angularly projecting lug 25 which is engaged in a suitable formed opening 26 provided in the lower end of the plate 21. At its lower end, the bar 24 is also provided with an outwardly projecting part 27 extending between the flanges 9 of the guide and terminating in a relatively wide finger piece 28. The part 27 is provided with an opening 29 therethrough to receive a resilient wire latch element 30. The upper end of said wire element above part 29 terminates in a resiliently acting coil 31 which is positioned between the outer face of the bar 24 and the flanges 9 on the guide 8. This coil by its expansion has frictional gripping engagement against the opposite side walls of the guide to thereby prevent lateral shifting movement of the bar relative to the guide and noise incident to contact therewith.

Beneath the finger piece 8 and at the inner end thereof, the wire latch element 30 has a vertically positioned coil 32 formed therein and a finger engaging loop 33 projecting outwardly from said coil. The other terminal of the wire at the other end of the loop 33 extends within the channel of the guide 8, said terminal being upwardly curved and angularly bent as at 34 for frictional gripping contact against the inner side of one of the guide flanges 9. The spring coil 32 normally acts to urge the loop 33 downwardly and maintain such gripping contact of the wire end 34 with the guide flange, whereby vertical shifting movement of the bar 24 and the shade bracket relative to the guide under the weight of the shade supported by the bracket, is prevented. This effective latched condition of the parts is illustrated in Fig. 2 of the drawings.

Assuming that the adjusting devices as above described have been attached to the window frame, and that the shades are supported in the brackets 13 and 14 at the top of the window as shown in Fig. 1, when it is desired to lower the top sash 5 to obtain ventilation, the user simultaneously engages the finger pieces 28 and the latch loops 33 at each side of the window with the thumb and forefinger of his hands as shown in Figs. 2 and 7 and presses upwardly upon the loop 33. The spring coil 32 will thus be contracted and the angular end 34 of the wire will be moved in the channel of the guide 8 and its terminal disengaged from the guide flange 9. At the same time, the upper coil 31 will be pressed inwardly against the bar 24. The two bars 24 then simultaneously move vertically in the respective guides in a downward direction, thus lowering the brackets 13 and 14 and the shades mounted therein to the required position, such movement of course, being limited by contact of the finger piece 28 with the lower stop block 10 of the guide. The upper sash 5 of the window may now be lowered until its upper edge is slightly above the upper sash S, thus insuring adequate ventilation without blowing or flapping of the window shades.

For the purpose of limiting the extent to which the brackets 13 and 14 might be adjusted out of horizontal alignment with each other to thereby prevent the release of the shade roller trunnions from supporting contact upon said brackets, I preferably provide a chain or other connecting element indicated at 35 extending between the brackets 13 and 14. This element may be permanently attached at one of its ends to one of the brackets and provided with means for detachable connection at its other end to the other bracket and might be otherwise located than as indicated in the drawings so as to render the same more or less inconspicuous. By the provision of such a connecting member, it will be readily seen that the extent to which one of the shade brackets might be vertically raised or lowered above or below the position of the other bracket, will be definitely limited so that the possibility of the detachment of the shade from the supporting brackets is obviated.

In Figs. 8 to 12 of the drawings, I have illustrated a slightly modified form of the actuating means for the adjustable brackets and the means for retaining said brackets in adjusted position. In this construction, the actuating member consists of a stiff wire rod 36 arranged in the channel of the fixed guide 8 and having an upper portion 37 extending at an inclination outwardly through the open side of the guide and terminating in a hook or angularly bent arm 38 which extends inwardly through the opening 26 in the lower end of the bracket carrying plate 21 and is resiliently urged into engagement with the base wall of the guide. Within the channel of the guide at the lower end of the part 37, said wire rod is formed with a narrow laterally offset loop 39, the lower side of which joins the upper portion of a relatively wide loop 40 which is laterally offset in the opposite direction with respect to the loop 39. The intermediate portions of these two loops have frictional sliding engagement with the opposite longitudinal side walls of the guide 8. From the lower loop 40, the rod 36 is extended downwardly along one of the side walls of the guide and beneath its in-turned flange 9 and below said guide, the lower end of the rod terminating in a suitable finger piece indicated at 41. As shown in connection with this construction, the stop members 10' may consist of U-shaped metal plates inserted between the edges of the guide flanges 9. They may be either welded to said flanges or merely frictionally held thereby to be rigidly fixed in place by the attaching screws. The wire rod 36 extending downwardly between one side of the lower stop 10' and the adjacent side wall of the guide 8, is held thereby in its proper relation to the side wall of the guide member and against inward displacement.

In the above described modified construction, the shade brackets and the plates 21 are retained in adjusted position by means of the member 42. This member preferably consists of a length of heavy spring wire having a central portion formed into the spring coils 43 from opposite sides of which, the comparatively long arms 44 extend downwardly and are urged by said spring coils 43 in relatively opposite directions into tight frictional bearing contact with the opposite longitudinal side walls of the guide 8. The spring coils 43 are located in registering relation with the opening 26 of the bracket carrying plate 21 and the angular arm or hook 38 of the rod 36 extends through said coils.

In the above described construction, it will be understood that when the bracket members are at the limit of their upward movement on their respective guides, the finger pieces 41 of the actuating members 36 are disposed externally of said guides below the same. Thus, from reference to Fig. 8 of the drawings, it will be seen that these finger pieces may be readily reached and grasped by a child or person of comparatively short stature, since they are located approximately at the upper rail of the lower sash. When the actuating members or rods 36 are pulled downwardly, the frictional resistance to such movement offered by the loop portions 39 and 40 of the rod and the spring arms 44 is overcome. This frictional resistance is however, ample to sustain the adjustable guides in their adjusted positions under the weight of the shade rollers. The engagement of the lower side of the loop 40 in the actuating rod 36 with the lower stop member 10', limits the extent of downward movement of the bracket members.

From the foregoing description considered in connection with the accompanying drawings, the construction, manner of operation and several advantages of my invention as herein described will be clearly understood. It will be seen that such a device may be easily and quickly applied to the ordinary window by the householder, without requiring the assistance of a skilled workman. In order that the device may be readily substituted for different forms of shade supporting brackets heretofore in general use, it may be necessary to make certain adjustments. Thus, the parts 15 and 17 of the brackets can be readily adjusted by bending the same from the angular offset 22 of the plate 21 in accordance with the length of the shade roller so as to insure a secure engagement of the roller trunnions in the openings and slots of the bracket members. In some instances, it may be possible to apply my present invention, without first requiring the removal of the old shade supporting brackets.

Since the channelled guide 8 and the shade supporting brackets mounted thereon are of relatively light sheet metal, these guides will readily flex or bend sufficiently to enable the same to be applied to window frames which may, to a certain extent, vary in width due to warping of the frames or for other reasons. Also, it will be obvious that as the bracket members 13 and 14 are disposed inwardly of the fixed guide channels, they will readily yield laterally relative to said channels in the vertical movement of the shade and the brackets, thus automatically accommodating themselves to the variable frame width and insuring entire freedom of the shade roller from excessive binding in any adjusted position of the brackets.

I have illustrated and described in more or less detail, two embodiments of my present improvements, which I have found to be entirely satisfactory in practical use. However, it is to be understood that the form and construction of the guides as well as the shade brackets and the actuating means therefor may also be produced in various other alternative structural forms. Therefore, as to the essential features of my present disclosure, I reserve the privilege of adopting all such legitimate changes therein as may be fairly included within the spirit and scope of the invention as claimed.

I claim:

1. In window shade adjusting means, a channel shaped sheet metal guide strip adapted to be secured to the window frame, a shade supporting bracket comprising a sheet metal plate extending longitudinally over the open side of the guide strip channel exteriorly thereof, said plate and the side walls of the guide strip having cooperating means integrally formed thereon and retaining the bracket in slidable connection with said strip, a shade roller supporting arm integral with one end of said plate disposed in offset parallel relation to the plane of said plate and resiliently yieldable relative to the plate and guide strip, and manually operable means within the channel of the guide strip connected to the other end of said plate for adjusting the bracket relative to the guide strip.

2. In window shade adjusting means, a channel shaped, sheet metal guide strip, a shade supporting bracket comprising an elongated sheet metal plate extending longitudinally over the open side of the guide strip channel exteriorly thereof, said plate and the side walls of the guide strip having cooperating means thereon to retain the bracket in slidable connection with said strip, said bracket plate and the guide strip being adapted to flex as a unit in attaching the guide strip to the window frame, a shade roller supporting arm integral with one end of said plate disposed in offset parallel relation to the plane of said plate and projecting longitudinally beyond one end thereof to resiliently yield relative to said plate and guide strip, and manually operable means mounted on said guide strip and connected to the other end of said plate for adjusting the bracket relative to the guide strip.

3. In window shade adjusting means, a channel shaped, sheet metal guide strip adapted to be secured to the window frame, a shade supporting bracket comprising a sheet metal plate having an integral shade supporting arm at one end laterally offset from said plate and disposed in a plane parallel therewth, said guide strip having inwardly projecting flanges on its side walls, and said bracket plate extending longitudinally upon the outer sides of said flanges over the open side of the channel and having integrally formed tongues at its opposite ends cooperating with said flanges to retain the bracket in slidable connection with the guide strip, and means mounted on the guide strip and connected to the other end of said plate for adjusting the bracket relative to the guide strip.

4. In window shade adjusting means, a guide strip, a shade supporting bracket comprising a plate extending longitudinally along one side of said strip, and means connecting said plate to the guide strip for longitudinal sliding movement thereon, said plate at one of its ends having an angularly disposed part extending longitudinally over one edge of the guide strip in closely adjacent relation thereto, and a shade roller supporting arm integrally formed with said part, bendable relative thereto and disposed substantially in the plane of said guide strip.

In testimony that I claim the foregoing as my invention, I have signed my name hereto.

NATHAN SLOBOTKIN.